United States Patent [19]

Bean

[11] 4,242,640
[45] Dec. 30, 1980

[54] CURRENT DISCHARGE FAST TIME CONSTANT AMPLIFIER

[75] Inventor: Donald E. Bean, Ruckersville, Va.

[73] Assignee: Sperry Corporation, New York, N.Y.

[21] Appl. No.: 866,445

[22] Filed: Jan. 3, 1978

[51] Int. Cl.² .................. H03K 3/02; H03K 4/02
[52] U.S. Cl. .................................. 328/187; 328/183; 307/237
[58] Field of Search .................. 328/183, 186, 187; 307/230, 237

[56] References Cited

U.S. PATENT DOCUMENTS

| | | | |
|---|---|---|---|
| 2,602,151 | 7/1952 | Carbrey | 328/183 |
| 3,035,184 | 5/1962 | Walker et al. | 328/183 X |
| 3,109,107 | 10/1963 | Lee | 328/183 X |
| 3,221,258 | 11/1965 | Pay | 328/187 X |
| 3,636,371 | 1/1972 | Quillier | 328/183 X |
| 4,009,399 | 2/1977 | Hofer | 328/183 X |

*Primary Examiner*—John S. Heyman
*Attorney, Agent, or Firm*—Howard P. Terry; Joseph M. Roehl

[57] ABSTRACT

A fast time constant circuit includes input and output amplifier means coupled together through an R-C network containing a series capacitor and a shunt-connected constant current source in which the level of current flow through the current source is regulated by means of a remote adjustable d.c. voltage source.

4 Claims, 1 Drawing Figure

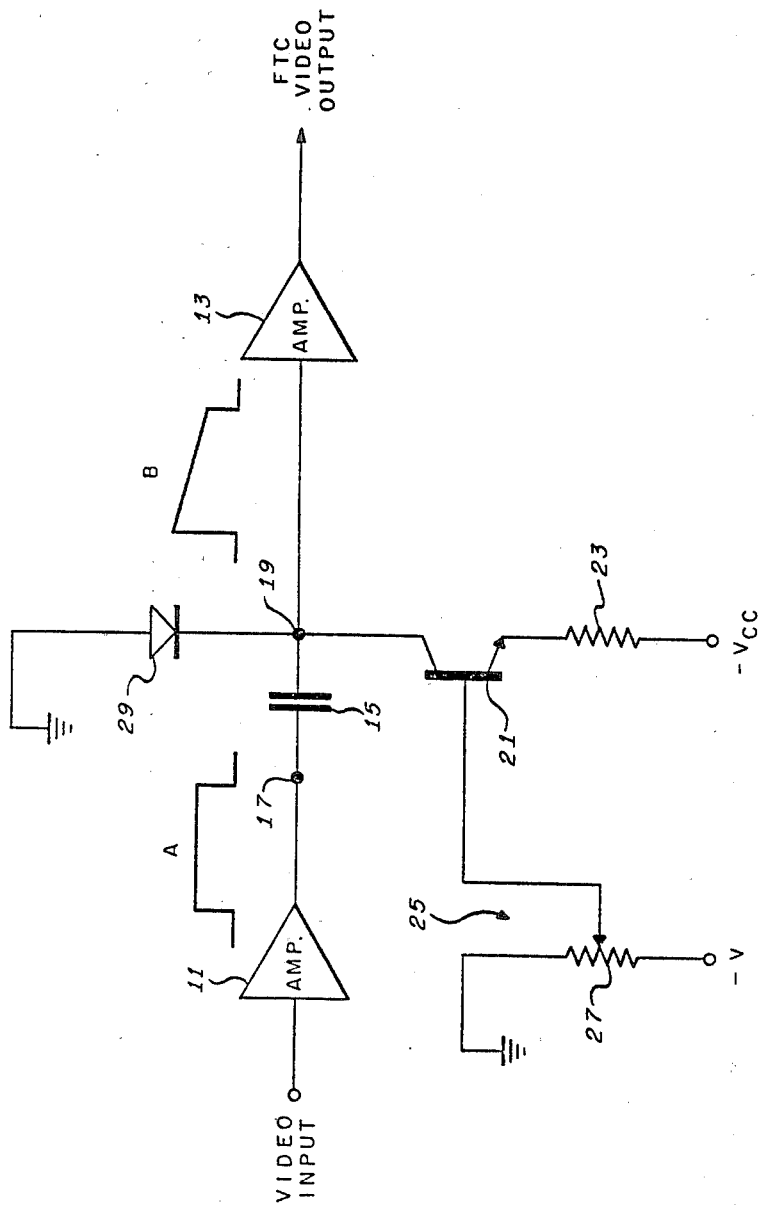

CURRENT DISCHARGE FAST TIME CONSTANT AMPLIFIER

BACKGROUND OF THE INVENTION

1. Field of the Invention

The present invention relates to video coupling circuits and, more specifically, to video coupling circuits for use in radar applications.

2. Description of the Prior Art

The sensitivity of radar receivers is ordinarily limited by the noise produced within the receiver. However, extraneous radiation may be picked up on the radar antenna, and various antijamming provisions are included in most radar receivers to overcome this type of interference. Additionally, a filter is often inserted between the detector and video amplifier that will pass individual video pulses but discriminate against frequencies associated with spurious echoes such as those caused by ground, sea or rain clutter. Several types of filter have been tried, but the simplest is the fast time constant (FTC) circuit, which is basically an R-C differentiating network inserted in the input circuit of the video amplifier. Such video coupling circuits must meet strict requirements if proper transient behavior is to be realized. If high frequency response is unduly limited, serious lengthening of the pulse signals may occur. If imperfect low frequency response is encountered, serious overshoot may occur in the voltage pulses. FTC circuits not only furnish some protection against interference, but also increase the contrast between single radar echoes in the presence of extraneous rain clutter signals.

In general, FTC circuits employ an impedance-coupling network in which the time constant can be varied to optomize the contrast between desired signal and clutter.

Some FTC circuits provide means for selecting between discrete values of time constant in the coupling network. In such circuits, the value of the FTC time constant is changed by means of a remote FTC switch. However, circuits of this type are limited by the number of switch positions that can be incorporated economically into the equipment.

Still other prior art FTC circuits provide continuously variable time constants by including a varactor diode as a variable capacitor or a diode as a variable resistor. However, circuits of this type suffer from a lack of dynamic range in the time constant adjustment.

SUMMARY OF THE INVENTION

An exceptionally wide dynamic range is achieved in an FTC coupling network by using a controllable constant current source to discharge the series capacitor at a selected rate.

BRIEF DESCRIPTION OF THE DRAWINGS

The sole FIGURE depicts a circuit employing the principles of the invention.

DESCRIPTION OF THE PREFERRED EMBODIMENT

Referring to the FIGURE, a current discharge fast time constant circuit constructed in accordance with the principles of the present invention includes a low output impedance input amplifier 11 to which the video input signals are applied. The signals from the FTC circuit are applied to external utilization circuits through a high input impedance output amplifier 13. A series capacitor 15 is coupled through its terminals 17 and 19 to the input and output amplifiers respectively. The terminal 19 is coupled through a transistor 21 and an emitter resistor 23 to an appropriate reference voltage. The base of the transistor 21 is coupled to a remote control voltage source 25 which includes a conventional potentiometer energized by a suitable negative voltage.

As is well known in the art, a transistor when connected in a circuit such as that shown in the figure will provide a constant collector current despite wide swings in collector voltage as long as the voltage applied to the base electrode is maintained constant. The magnitude of the collector current in such situations is determined by the value of the base voltage, which in turn is determined by the setting of the potentiometer 27.

A clamping diode 29 is connected between ground potential and the terminal 19 of the capacitor 15 and oriented to conduct when the voltage at the terminal 19 drops below ground level. Thus during normal operation, at the termination of a video pulse the voltage at the terminal 19 would ordinarily overshoot and swing below ground level. However, the diode 29 prevents this from occurring.

The operation of the circuit can be understood by referring to curves A and B which represent voltages appearing at the output of the amplifier 11 and the input of the amplifier 13 respectively when a rectangular voltage pulse representing a radar echo is applied to the input of the amplifier 11. In such a situation a rectangular pulse is applied to the coupling network. Because of the constant current characteristics of the discharge circuit, the voltage at the terminal 19 decays at a constant rate throughout the duration of the video pulse. The rate of decay, of course, depends upon the base voltage of the transistor 21 and, therefore, upon the setting of the potentiometer 27. Under normal operating conditions, when there is insignificant interference from rain clutter, the potentiometer 27 can be set for minimum collector current so that very little decay of the rectangular wave is experienced. As conditions deteriorate, so that clutter becomes more evident, the collector current can be increased to a suitable level so as to obtain the maximum contrast between the desired radar echo and the clutter signal. Since the collector current level is a continuous function of the setting of the potentiometer, infinite control may be obtained within the range of the potentiometer 27. Since the value of the collector current can be regulated over a wide range of values by means of the adjustable base voltage, the constant current discharge circuit provides an extremely wide dynamic range. In prior art continuously adjustable FTC circuits such as the previously described circuit employing a diode as a variable resistor, the maximum value of dynamic range to be expected is in the order of 20 dB. By using the present circuit, dynamic ranges in the order of 52 dB have been realized, and dynamic ranges in excess of this value are possible since the dynamic range is limited only by the circuit parameters.

Because the control voltage is applied to the base electrode of the transistor 21, the control voltage is substantially isolated from the discharge circuit itself. Thus the control circuit 25 can be located at a considerable distance from the FTC circuit proper. In prior art circuits, switching arrangements in the immediate vicinity of the FTC circuit itself are required to adjust the value of the capacitor or resistor. In some applications it is desirable to provide a control circuit which is separated from the FTC circuit by distances of 15 meters or so. Such an arrangement is entirely practical with a circuit of the present invention whereas such arrangements would be impractical with prior art circuits in many instances.

While the invention has been described in its preferred embodiments, it is to be understood that the words which have been used are words of description rather than limitation and that changes may be made within the purview of the appended claims without departing from the true scope and spirit of the invention in its broader aspects.

I claim:

1. A fast time constant video amplifier circuit comprising a low output impedance amplifier input means coupled to receive video pulses, a high input impedance amplifier output means for providing video output pulses to external circuits, a series capacitor having first and second terminals coupled between said input and output means respectively, a constant current source connected between said second terminal and a reference voltage, diode means for clamping said second terminal to ground potential at the termination of a video pulse, and means to adjust the level of current flowing through said source.

2. The circuit of claim 1 wherein the constant current source includes a transistor having its collector and emitter electrodes coupled between said second terminal and said reference voltage and its base electrode coupled to a source of variable d.c. voltage.

3. The circuit of claim 2 wherein the transistor is an n-p-n device having its collector electrode connected to said second terminal and its emitter electrode coupled to said reference voltage through a series resistor, said circuit being further characterized in that said diode means has its cathode connected to said second terminal.

4. The circuit of claim 3 wherein the source of variable d.c. voltage includes a potentiometer having its adjustable arm connected to the base electrode of said transistor.

* * * * *